D. S. PATERSON.
NUT LOCK.
APPLICATION FILED MAY 10, 1910.
995,031.
Patented June 13, 1911.
2 SHEETS—SHEET 1.
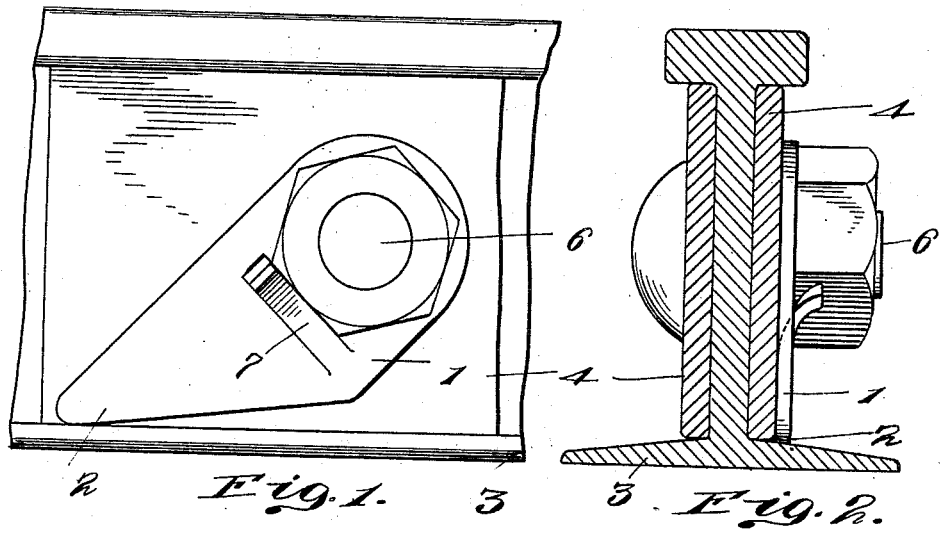
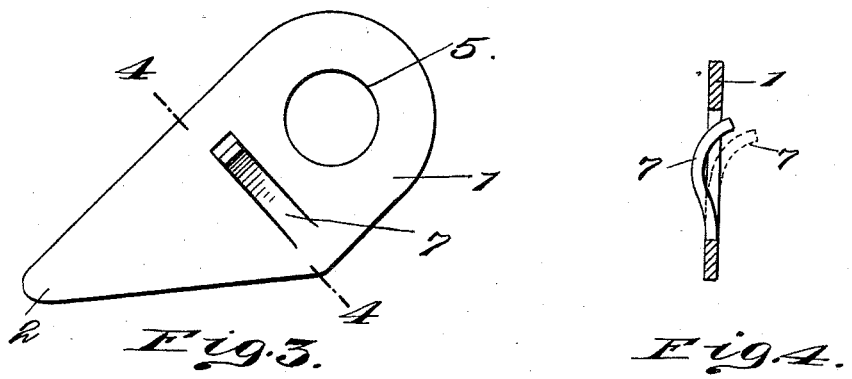
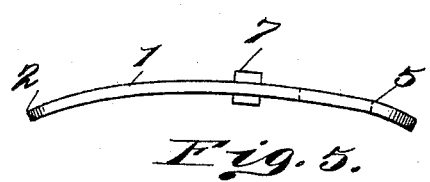

D. S. PATERSON.
NUT LOCK.
APPLICATION FILED MAY 10, 1910.

995,031.

Patented June 13, 1911.
2 SHEETS—SHEET 2.

Witnesses:
Harry C. Hebig
J. Wallace

Inventor
Dugald S. Paterson
By his Attorney
Henry M. Link

UNITED STATES PATENT OFFICE.

DUGALD S. PATERSON, OF PHILADELPHIA, PENNSYLVANIA.

NUT-LOCK.

995,031.   Specification of Letters Patent.   Patented June 13, 1911.

Application filed May 10, 1910. Serial No. 560,489.

*To all whom it may concern:*

Be it known that I, DUGALD SINCLAIR PATERSON, a citizen of the United States, residing in the city of Philadelphia, county of Philadelphia, and Commonwealth of Pennsylvania, have invented certain new and useful Improvements in Nut-Locks, of which the following is a full, clear, and exact specification.

My invention relates to nut locks and is particularly adapted for use on railroad rails.

It has for its object to provide a simple and efficient nut lock that will fit varying sizes of rails and will lock the nut irrespective of the precise location of the bolt; also to provide in such structure means for taking up any loss of material in the head or nut of the bolt or of the connected parts due to wear from vibration or other causes; also to provide locking means for the nut which are automatic in their action; also to provide means for seating a side of the nut against said locking means.

An advantageous embodiment of my invention is disclosed in the accompanying drawing wherein—

Figure 6:
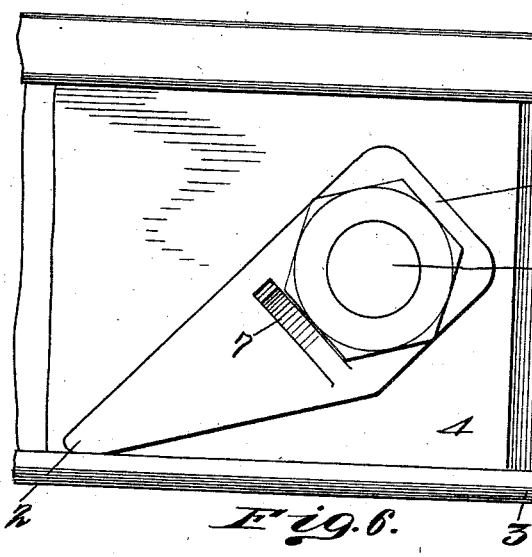
Figure 7:
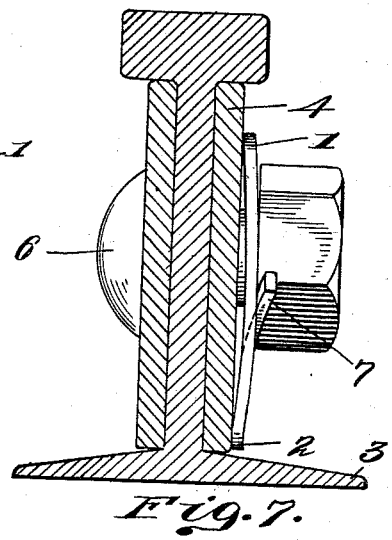
Figure 8:
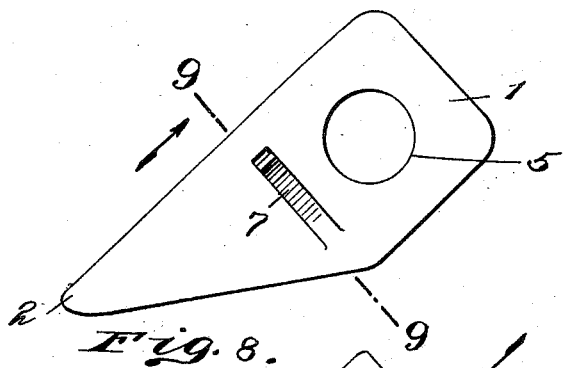
Figure 9:
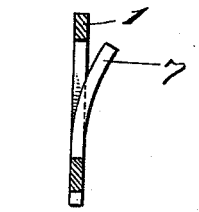
Figure 10:
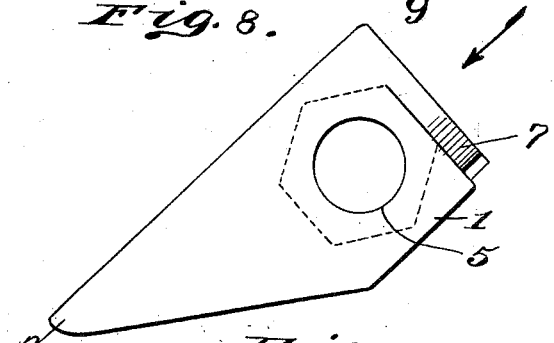
Figure 11:
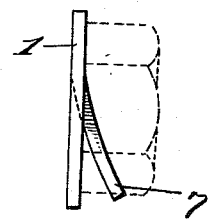
Figure 12:
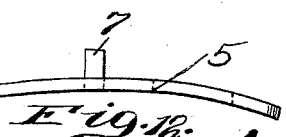

Figure 1 is a face view of the preferred form of my nut in place. Fig. 2 is an end view from the left of Fig. 1, the nut being turned to its seat. Fig. 3 is a face view of the form of my invention illustrated in Fig. 1, separated from the rail. Fig. 4 is a transverse section on the line 4—4 of Fig. 3. Fig. 5 is a side view of the upper side of Fig. 3. Fig. 6 is a face view of a modified form in place. Fig. 7 is an end view from the left of Fig. 6. Fig. 8 is a face view of the form of Fig. 6, separated. Fig. 9 is a section on the line 9—9 of Fig. 8. Figs. 10 and 11 are views of a modified form. Fig. 12 is a side view of the upper side of Fig. 8.

In carrying out my invention a plate 1, is employed of metal capable of being tempered into a spring, and at one end of said plate I produce a locking-projection or point 2, which is adapted to rest against the bottom flange 3, of the rail, either directly or through the bottom flange of the fish-plate 4, in cases where said fish-plate is so made. The plate 1, is provided with a bolt-hole 5, to receive the bolt 6, which at its opposite end has the usual head engaging the opposite fish-plate. The nut and bolt are of any usual or desired form, my invention being equally applicable to many styles of bolts and nuts and to varying location of bolt-holes. An ear or lug 7, is cut out of the metal plate 1, at two sides and one end, the other end being attached thereto, and this lug is slightly bent, as shown in Fig. 4, so that a considerable part of its body is below the plate, but its free end is above it, before the plate 1, is tempered, so that it shall form a spring lug.

I have presented a useful embodiment of my invention, but the principles thereof are not necessarily limited to the precise structural details illustrated, but may be embodied in other equivalent structures.

The plate 1, is bowed longitudinally as illustrated in Fig. 5, before it is tempered, in such manner that the outer and convex side carries the free end of the lug 7, projecting outwardly therefrom or from the convex side thereof. After the plate 1, has been perforated at 5, and has had the lug 7, formed therein and bent up and has been bowed longitudinally, it is tempered so that it will have the resilient properties of a spring. The lug 7, may then be depressed, but will tend to spring back to its original shape. Likewise the plate 1, will in itself constitute a spring-plate, the ends of which rest against the fish-plate and which will be depressed by the seating of the nut, but will have a constant tendency to resume its original bowed shape and will exert a steady pressure against the nut.

In applying my invention the fish-plates and bolt are assembled in the usual manner. The plate 1, is then applied upon the bolt, which enters hole 5, and the end 2, of the plate will rest against the flange 3. The nut will then be applied and turned to its seat. The lug 7, is so situated as to be substantially flush against the side of the nut when said lug and the side of the nut are parallel, but to lie under the corners of the nut if such surfaces are not parallel. As the nut is turned it will ride over the lug 7, which will be depressed and will automatically spring back when free. Thereby, when the nut has been turned far enough so that the plate is sufficiently flattened or compressed and its side is parallel with the side of the lug 7, the said lug will spring up against the side of the nut and will effectually prevent the unscrewing of the nut, interposing a very effective resistance to such unscrewing. The end 2, of the plate will be in contact with the flange and will prevent the plate turning. The length of the plate from the bolt-hole to the end 2, should be greater than the distance from the bolt-hole in the rail to the flange of the rail, and the plate, therefore, should be of sufficient length in this part to accommodate the various dimensions ordinarily used, as the precise engaging-point of the end 2, with the flange is immaterial, provided it is to the left of the bolt-hole.

The plate 1, is bowed longitudinally and tempered so that any wear in the fish-plates, bolt, head, or nut, &c., will be compensated for by the spring tendency of said plate and thereby a tight fit insured at all times.

A modified form is illustrated in Figs. 6 to 9, wherein the only change is in the shape of the lug 7, here shown as bent directly from its point of engagement with the plate, outward from the convex side of the plate.

Another modified form is illustrated in Figs. 10 and 11, wherein the lug 7, is formed in the plate 1, at the opposite side of the bolt-hole from that shown in the other figures and at the end of the plate. The said lug, therefore, as it engages the opposite side of the nut, is pointed in the opposite direction. In other respects its action and function are the same as above indicated.

The point of location of the spring lug upon the plate is not essential, provided it is so located as that it shall engage a side of the nut.

I claim:

1. A nut-lock, comprising a plate of sheet metal having a bolt-hole therein, a spring lug adjacent said bolt-hole adapted to engage a nut and prevent the same from turning backward, and an arm of reduced width adapted to contact with a flange of a rail to prevent rotation of the nut-lock.

2. A nut-lock, comprising a plate of sheet metal having a bolt-hole therein, a spring lug adjacent said bolt-hole adapted to engage a nut and prevent the same from turning backward, and an integral arm of reduced width adapted to contact with a flange of a rail to prevent rotation of the nut-lock.

3. A nut-lock, comprising a plate of spring metal bowed longitudinally and having a bolt-hole therein, a spring lug adjacent said bolt-hole adapted to engage a nut and prevent the same from turning backward, and an arm of reduced width adapted to contact with a flange of a rail to prevent rotation of the nut-lock.

4. A nut-lock, comprising a plate of sheet metal having a bolt-hole therein, a spring lug adjacent said bolt-hole adapted to lie alongside of a side of a nut and prevent the same from turning backward, and an arm of reduced width adapted to contact with a flange of a rail to prevent rotation of the nut-lock.

5. A nut-lock, comprising a plate of sheet metal having a bolt-hole therein, a spring lug adjacent said bolt-hole having its body depressed below the inner side of the plate and its free end above the outer side of said plate adapted to engage a nut and prevent the same from turning backward, and an arm of reduced width adapted to contact with a flange of a rail to prevent rotation of the nut-lock.

6. A nut-lock, comprising a plate of spring metal bowed longitudinally and having a bolt hole therein, a spring lug adjacent said bolt-hole having its body depressed below the inner side of the plate and its free end above the outer side of said plate adapted to engage a nut and prevent the same from turning backward, and an arm of reduced width adapted to contact with a flange of a rail to prevent rotation of the nut-lock.

7. A nut-lock, comprising a plate of spring metal having a longitudinal reduced extension integral therewith constituting an arm for engaging the flange of a rail whereby turning of the lock is prevented, said plate and extension being bowed longitudinally, said plate also having a bolt-hole near one end and a spring-lug adjacent said bolt-hole formed integral therewith and adapted to engage a nut to prevent backward turning thereof.

8. A nut-lock, comprising a plate of spring metal having a longitudinal extension integral therewith constituting an arm for engaging the flange of a rail whereby turning of the lock is prevented, said plate and extension being bowed longitudinally, said plate also having a bolt-hole near one end and a spring-lug adjacent said bolt-hole formed integral therewith and adapted to engage a nut to prevent backward turning thereof.

9. A nut lock comprising a plate of sheet metal bowed throughout, having a bolt hole therein, a spring lug adjacent to said bolt hole adapted to engage a nut and prevent the same from turning backward, and an arm integral with said plate, the sides of which converge toward the outer extremity of the arm, said arm adapted to contact with a flange of a rail to prevent rotation of the nut lock.

In witness whereof, I have hereunto set my hand in the presence of two subscribing witnesses.

DUGALD S. PATERSON.

Witnesses:
Louis M. Fridenberg,
H. Chas. Rawlins.

---

Copies of this patent may be obtained for five cents each, by addressing the "Commissioner of Patents, Washington, D. C."